US012596528B2

(12) United States Patent
Avudaiyappan et al.

(10) Patent No.: US 12,596,528 B2
(45) Date of Patent: Apr. 7, 2026

(54) MULTIPURPOSE MULTIPLY-ACCUMULATOR ARRAY

(71) Applicant: Microsoft Technology Licensing, LLC, Redmond, WA (US)

(72) Inventors: Karthikeyan Avudaiyappan, Sunnyvale, CA (US); Jeffrey A. Andrews, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1046 days.

(21) Appl. No.: 17/564,091

(22) Filed: Dec. 28, 2021

(65) Prior Publication Data

US 2023/0214185 A1 Jul. 6, 2023

(51) Int. Cl.
*G06F 7/544* (2006.01)
*G06F 5/06* (2006.01)

(52) U.S. Cl.
CPC .............. *G06F 7/5443* (2013.01); *G06F 5/06* (2013.01)

(58) Field of Classification Search
CPC ........ G06F 7/5443; G06F 5/06; G06F 17/153; G06F 7/544; G06N 3/0464; G06T 1/20; G06T 5/60
See application file for complete search history.

(56) References Cited

U.S. PATENT DOCUMENTS

| | | | | |
|---|---|---|---|---|
| 5,333,320 A | * | 7/1994 | Seki | G06F 15/17 |
| | | | | 713/100 |
| 11,194,490 B1 | * | 12/2021 | Sunkavalli | G06F 3/0673 |

| | | | | |
|---|---|---|---|---|
| 2002/0107900 A1 | * | 8/2002 | Enenkel | G06F 7/483 |
| | | | | 708/497 |
| 2018/0315155 A1 | * | 11/2018 | Park | G06V 10/955 |
| 2019/0012295 A1 | * | 1/2019 | Yinger | G06F 7/5443 |
| 2020/0311183 A1 | * | 10/2020 | Simpson | G06F 17/16 |
| 2021/0271960 A1 | * | 9/2021 | Raha | G06F 9/3001 |

(Continued)

FOREIGN PATENT DOCUMENTS

WO        2021142713 A1      7/2021

OTHER PUBLICATIONS

J. Zhang et al., "CompAct: On-chip Compression of Activations for Low Power Systolic Array Based CNN Acceleration," Oct. 2019. (Year: 2019).*

(Continued)

*Primary Examiner* — Emily E Larocque
*Assistant Examiner* — Maria De Jesus Rivera

(57) ABSTRACT

Embodiments of the present disclosure include a multipurpose multiply-accumulator (MAC) array circuit comprising one or more input memories for receiving operands and a plurality of multiply-accumulator circuits each selectively coupled to the one or more input memories to receive at least a pair of operands and generate a result. Each of the plurality of multiply-accumulator circuits receives operands from the one or more input memories independently. Additionally, selection of operands from the one or more input memories is controlled based on at least an operation and/or data types, where different operation and/or data types configure the plurality of multiply-accumulator circuits to receive different pairs of operands from the one or more input memories to execute particular operation types.

20 Claims, 6 Drawing Sheets

(56)  References Cited

U.S. PATENT DOCUMENTS

2021/0349714 A1*   11/2021   Ramesh ................... G06F 5/06
2021/0390076 A1    12/2021   Fang et al.
2023/0196500 A1*    6/2023   Jiang ........................ G06T 1/60
                                                        382/190

OTHER PUBLICATIONS

L. Dang et al., "Depth-Wise Separable Convolution Neural Network with Residual Connection for Hyperspectral Image Classification," Oct. 2020. (Year: 2020).*

S. Selvam et al., "FuSeConv Fully Separable Convolutions for Inference on Systolic Arrays", May 2021. (Year: 2021).*

"International Search Report and Written Opinion Issued in PCT Application No. PCT/US22/044783", Mailed Date: Jan. 9, 2023, 9 Pages.

First Examination Report Received for Indian Application No. 202417045836 mailed on Jan. 16, 2026, 08 Pages.

* cited by examiner

*Fig. 7C*

MULTIPURPOSE MULTIPLY-ACCUMULATOR ARRAY

BACKGROUND

The present disclosure relates generally to digital circuits and systems, and in particular to a multipurpose multiply-accumulator array circuit.

Many modern digital systems and applications benefit from providing functionality to multiply digital values together and obtain results. From graphics processing to artificial intelligence, multiplication of digital values is a functionality in increasing demand. Many of these applications require digital systems that can multiply digital values together and accumulate (e.g., add) the result. These applications may require increasing computational power and efficiency to handle the increasing number of computations required.

Multiply-accumulate (MAC) operations in many systems may vary according to the particular algorithm being executed. For example, some systems may require different MAC operations to perform N-dimensional (e.g., 3D) convolutions, MxN filtering, depth-wise convolutions, or matrix multiplications. Accordingly, developing a multiply-accumulator architecture that can handle multiple different types of operations without burdensome preprocessing or manipulations by software of input data in memory, may be very beneficial for various applications.

BRIEF DESCRIPTION OF THE DRAWINGS

FIG. 7C illustrates operation of the MAC for a filter operation according to an embodiment.

DETAILED DESCRIPTION

Described herein is a multipurpose MAC array circuit. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

In some embodiments, features and advantages of the present disclosure include circuit techniques for performing multiple different types of operations in a multiply-accumulator (MAC) array circuit. For example, in various embodiments illustrated below, the same MAC array may be used to perform 3-dimensional (3D) convolution, depth-wise convolution, MxN filtering, and matrix multiplication. Advantageously, in some embodiments, no software controlled reconfiguration of the input data operands transferred from memory to the MAC array are required.

Figure 1:
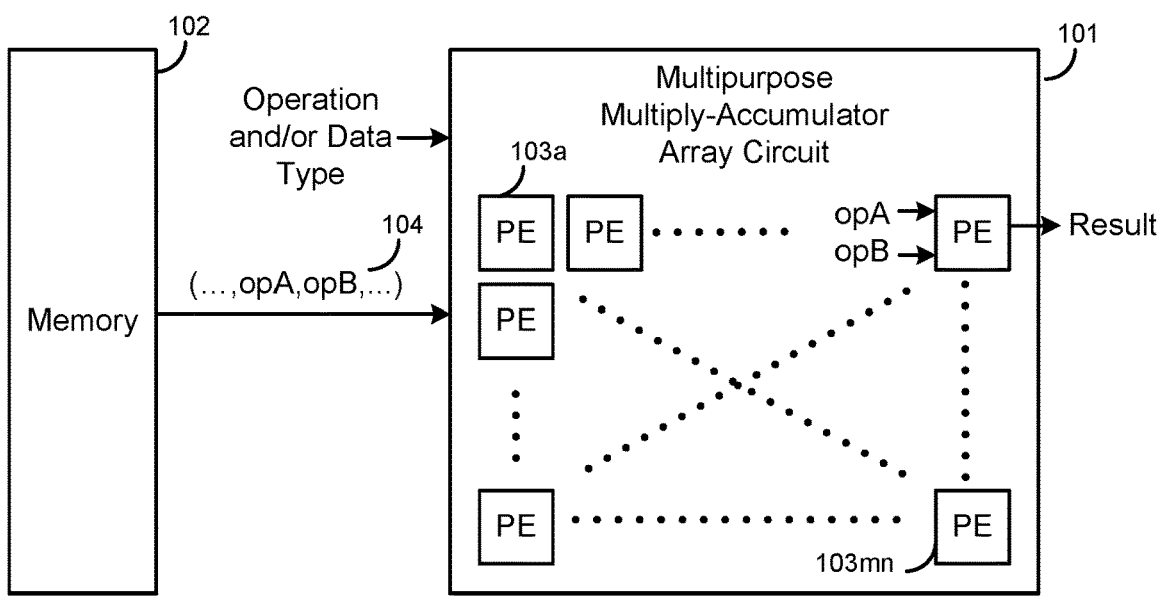
FIG. 1 illustrates a multipurpose multiply-accumulate array circuit according to an embodiment.

FIG. 1 illustrates a multipurpose MAC array circuit according to an embodiment. Operands 104 may be received and stored in a memory 102. Operands 104 are then selectively coupled from memory 102 to a multipurpose MAC array circuit 101 for processing according to a variety of operation types. MAC array 101 may comprise a plurality of multiply-accumulate circuits (referred to herein as MAC circuits or processing elements, PEs), such as PEs 103a-103mn, for example. The PEs may be arranged to form an array, such as an NxM array, where N and M are integers (e.g., a 16×16 array of PEs). Each PE may receive two operands (e.g., operand A, opA, and operand B, opB). When a MAC reads operands from memory, it receives one operand A data element and one operand B data element. Operands may be stored in a variety of formats, such as integers, floats, or other formats for storing values in a digital system. For example, each operand may be 2 bytes (2B) in size. Each PE performs a multiply-accumulate:

$$Result=MAC\_Output=(Operand\_A*Operand\_B)+ MAC\_output\_previous;$$

The result from each PE may be used in a variety of manners based on the operation being performed. Such an operation may take one cycle, for example.

Advantageously, each PE may receive operands from memory 102 independently. For example, in various embodiments and uses, each PE may be selectively coupled to memory, where the pair of inputs to the PE may be configured to receive data from different locations in memory 102. Accordingly, each PE may receive input operands from configurable locations in memory 102 independent of other PEs in the MAC array, based on an operation type or a data type (or both), for example, as well as a PE number in some embodiments described below. This technique results in a high degree of flexibility in how the PEs receive input operands and how the PEs may be used by the MAC array circuit to perform different operations, for example.

Multipurpose MAC array 101 may further receive an operation type and/or data type. Operation type and/or data type may be electronic signals (e.g., digital signals or bits) indicating which of a variety of operation types are to be performed by the multipurpose MAC array 101. The operation type and/or data type may control selection of operands 104 from memory 102 by each PE, where different operation types configure the PEs to receive different pairs of operands from memory 102 to execute the particular operation types (e.g., 3D convolutions, depth-wise convolution, filtering, and/or matrix multiplication). Examples of how different operation types are performed by changing how the operands are read from memory 102 and fed into the MAC array are described in more detail below.

Figure 2:
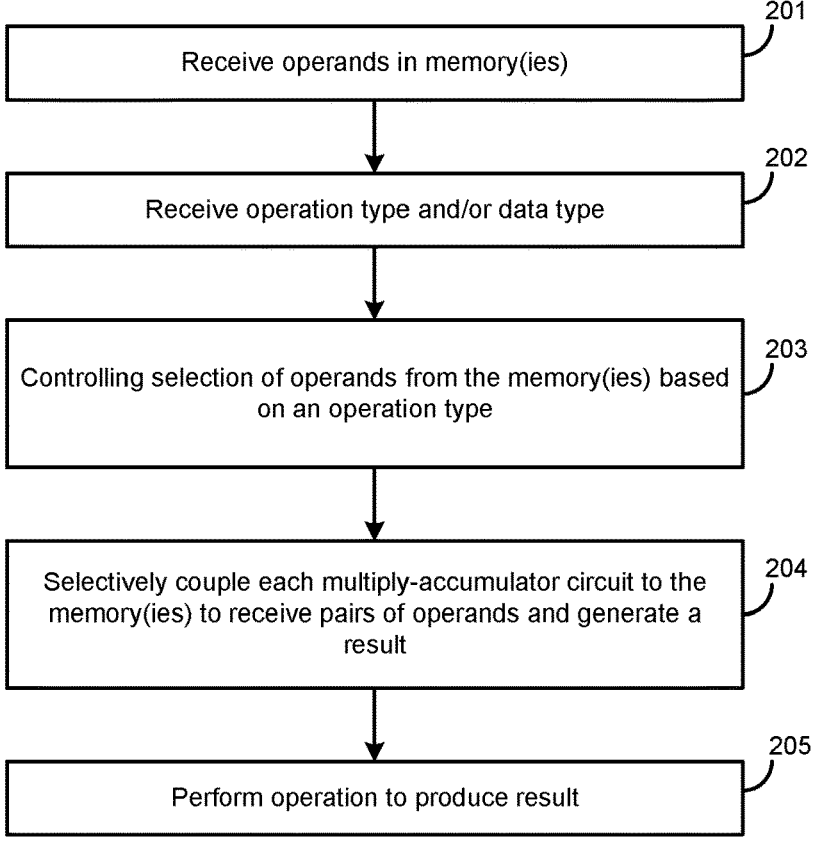
FIG. 2 illustrates a method according to an embodiment.

FIG. 2 illustrates a method according to an embodiment. At 201, operands are received in one or more memories. At 202, an operation type and/or the associated data type are received by a MAC array circuit. At 203, selection of operands to be received by the MAC array from memory is controlled based on the operation type. At 204, the inputs of each PE are selectively coupled to memory based on the operation type and/or data type to receive pairs of operands and generate a result. At 205, the operation is performed, and a result is produced by each PE. As mentioned above and illustrated further below, selective coupling of operands to independent PEs advantageously allows the MAC array to perform multiple different operation types without any pre-processing and manipulation by SW of the input data.

Figure 3:
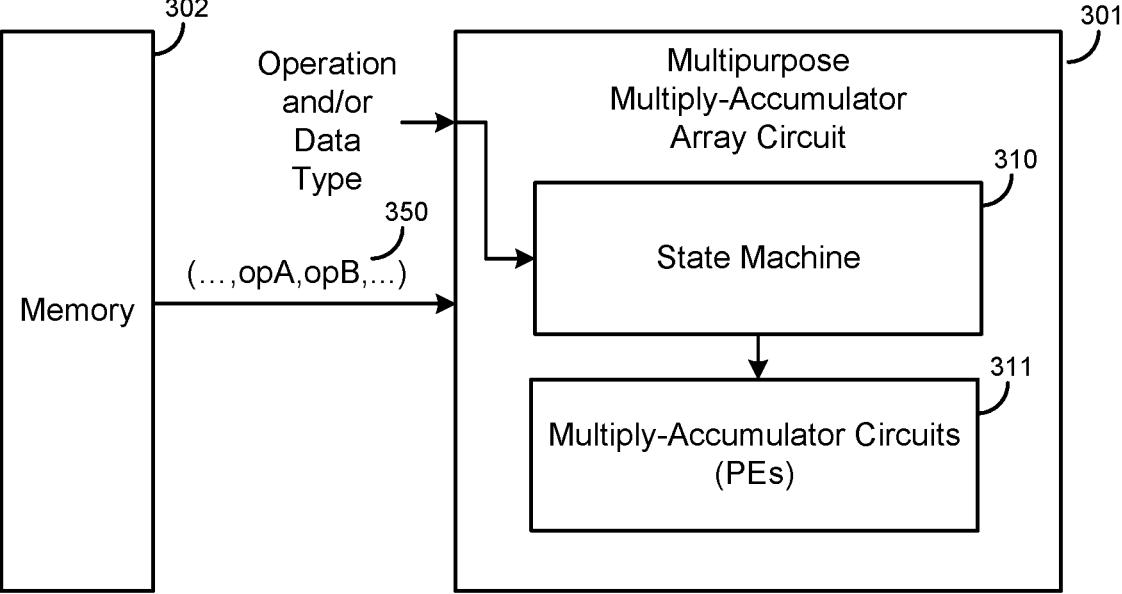
FIG. 3 illustrates a multipurpose multiply-accumulate array circuit according to another embodiment.

FIG. 3 illustrates a multipurpose multiply-accumulate array circuit according to another embodiment. Features and advantages of the present disclosure include a MAC array circuit that may implement multiple different operation types. In this example, memory 302 is coupled to MAC array circuit 301 for selectively coupling operands 350 into PEs 311. In this example, MAC array circuit 301 further includes a state machine 310 having at least one input to receive the operation type and outputs configured to control loading of operands into the PEs based on the operation type and PE number. State machine 310 may be implemented as a hardwired digital circuit, for example, which may advantageously configure each PE to access particular memory locations based on the operation type, as well as a PE number, for example. This approach may eliminate the need for software to rearrange operands in memory prior to loading into the MAC array, for example.

Figure 4A:
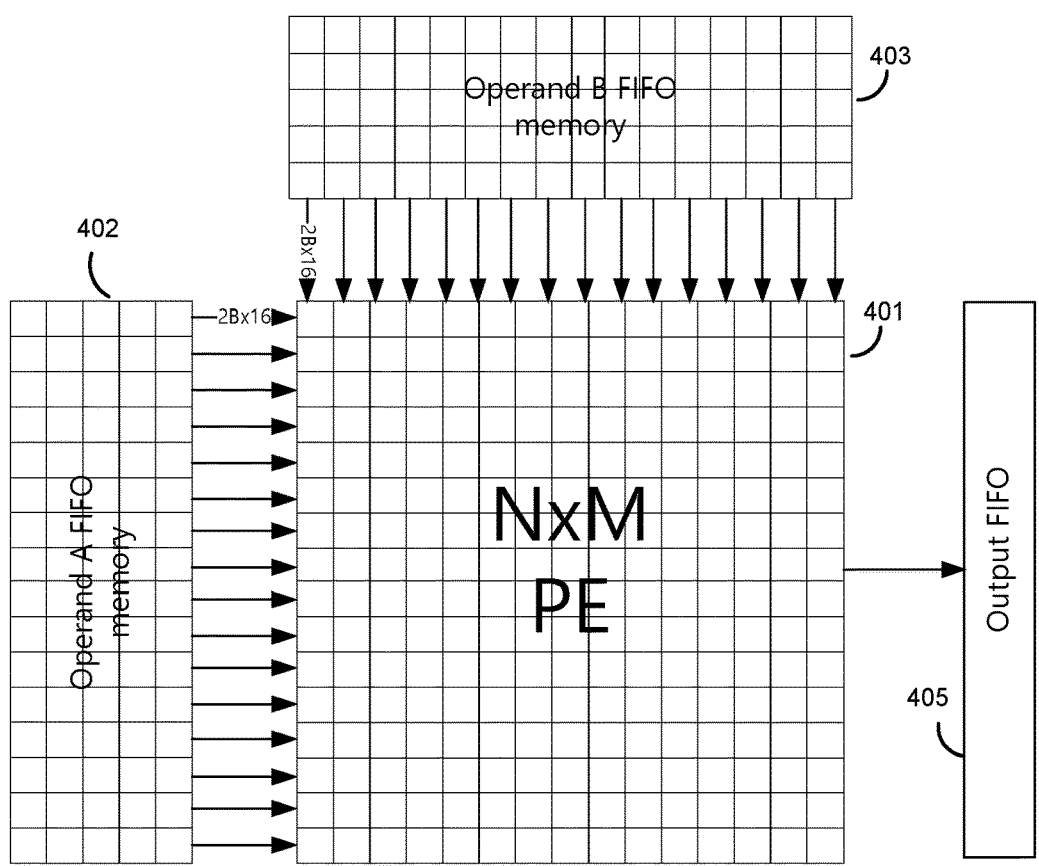
FIG. 4A illustrates an example multipurpose multiply-accumulate array circuit according to an embodiment.
Figure 4B:
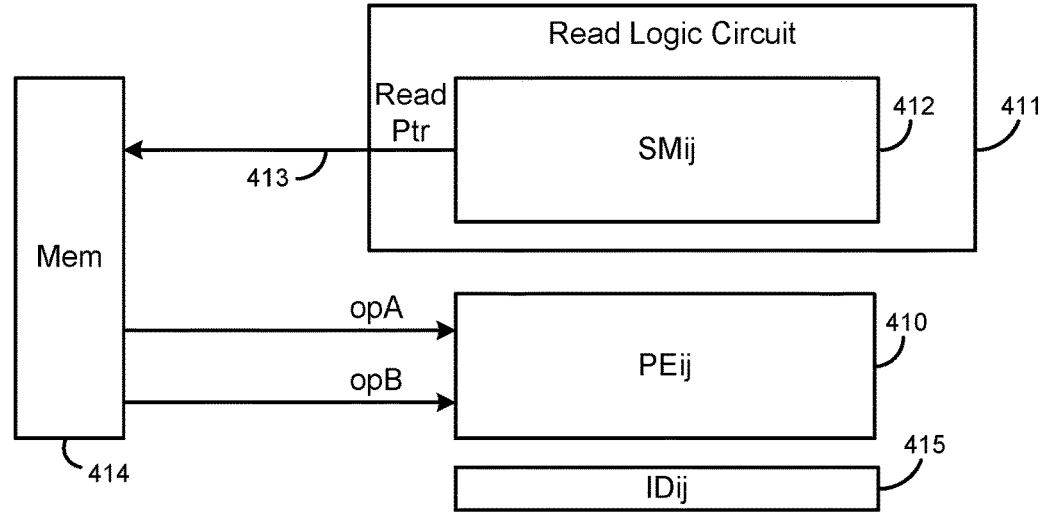
FIG. 4B illustrates an example of a single multipurpose multiply-accumulate circuit according to an embodiment.

FIGS. 4A-B illustrate an example N×M MAC array circuit 401 according to an embodiment. In this example, MAC array circuit 401 is coupled to two (2) first-in first-out (FIFO) memories 402-403. MAC array circuit 401 includes N rows and M columns of PEs (e.g., 16×16=256 PEs). Each PE may have dedicated wires to couple to input operands from each of the FIFOs into the PE. For example, if the operands are 2 bytes each, then there are 16 unique 2B-wires from FIFO 402 to each row of MAC array 401 coupled to the 16 columns (i.e., 2Bx16 per row output of FIFO 402 into the rows of MAC array 401), and there are 16 unique 2B-wires from FIFO 403 to each column of MAC array 401 coupled to the 16 rows (i.e., 2Bx16 per column output of FIFO 403 into the rows of MAC array 401). Accordingly, each FIFO may supply each PE with its own unique set of operands A and B. Outputs from the PEs may be coupled to output FIFO memories 405, for example.

FIG. 4B illustrates an example of a single multipurpose multiply-accumulate circuit (PE) according to an embodiment. In this example, MAC array 401 comprises a plurality of read logic circuits. Each of the PEs has an associated read logic circuit to control loading of operands from memory 414 to the PE. FIG. 4B illustrates an example PE 410 in the i'th row and j'th column of the MAC array 401. PE 410 has an associated read logic circuit 411, which may include a state machine (SMij) 412 and a read pointer 413. In some embodiments, PEs in a MAC array (e.g., PE 410) may have a plurality of identifiers, also known as the PE identifier or number, configured to specify the position of each of the PEs within the MAC array 401, so that the plurality of PEs logic, which reads from the FIFOs, reads and assigns operands to the MAC array's PEs according to the operation being performed and the position of the PEs. This technique may be particularly advantageous because a MAC array can perform multiple linear algebraic operations such as Depth-wise convolution, M×N filter operation, and sparse matrix multiplication, all without any SW involvement to rearrange the input tensors, for example.

Figure 5:
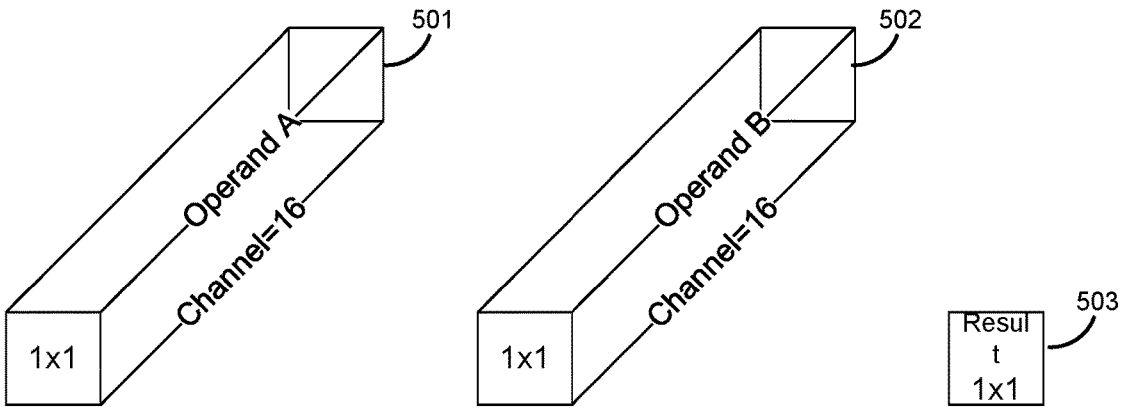
FIG. 5 illustrates 3D convolution according to an embodiment.

FIG. 5 illustrates 3D convolution according to an embodiment. Typically, for 3D convolution, each row of a MAC array would receive a unique operand A 501 and each column would receive a unique operand B 502. In a typical MAC array performing 3D convolution, operand A 501 is shared by all columns, and operand B 502 is shared by all rows. In the absence of zeros in both operands, in a 16×16 MAC array, it takes a PE 16 cycles to perform the 3D convolution operation and produce result 503. However, in some applications, each operand tends have a random percentage of zeros (referred to as sparsity), and hence it is possible to operate the PE in FIG. 4B such that it that can take anywhere from 1 to 16 cycles based on the number of non-zero operands. For example, if all 16 operands are zeros, it still takes 1 cycle for the PE to produce result 503. Using a MAC array according to the present disclosure (e.g., in FIGS. 4A and 4B), operand A may not be shared by all columns. Instead, each column in each row, may receive its own unique operand A. Similarly, operand B shown above may not be shared by all rows. Instead, each row in each column may receive its own unique operand B. In such a MAC array with independent PEs, once a PE has completed producing a scalar result 503, it increments its read pointers to its two FIFO memories to fetch another set of operands, A and B to supply each PE with its own unique set of non-zero operands A and B. Accordingly, the independence of the PEs may produce results at different times and advantageously allow for acceleration of the operation if the operands are sparse.

Figure 6:
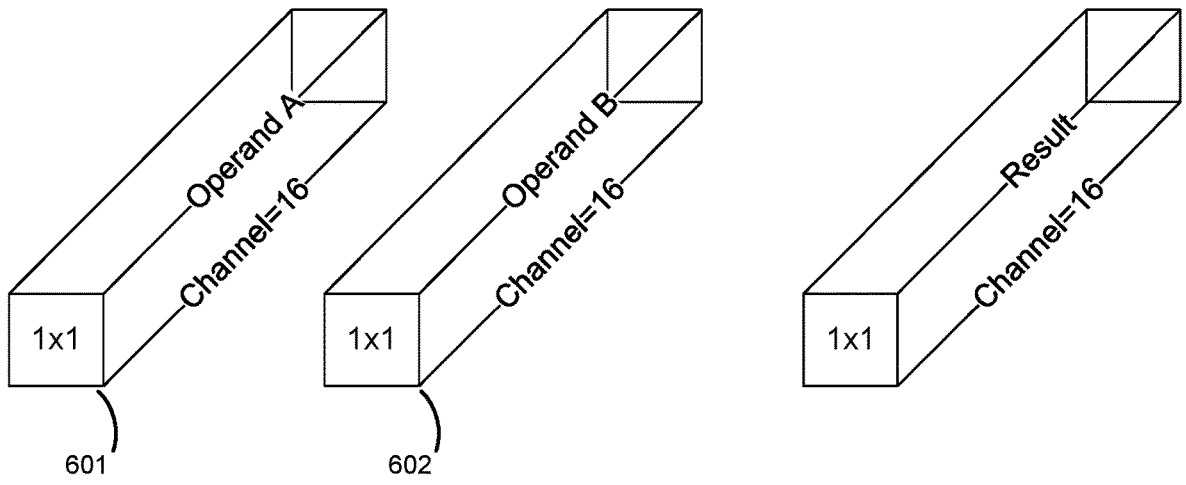
FIG. 6 illustrates depth-wise convolution according to an embodiment.

FIG. 6 illustrates depth-wise convolution according to an embodiment. A depth-wise convolution operation performs the function A[i]*B[i]. In this example, operand A 601 and operand B 602 are tensors, whose height×width×channel dimension is 1×1×16 for illustrative purposes. It is to be understood that other size tensors may be used. For depth-wise convolution, during execution, each multiply-accumulator circuit in each row receives a different first operand and each multiply-accumulator circuit in each column receives a different second operand. Further, each multiply-accumulator circuit receives a unique channel number from the first and second operands. For instance, the following Table 1 shows the assignment of operands A and B to the 16 rows and columns of the MA to perform depth-wise convolution.

TABLE 1

|  | Col0 | Col1 | Col2 | . . . Col15 |
|---|---|---|---|---|
| Row0 | A0[0]*B0[0] | A0[1]*B0[1] | A0[2]*B0[2] | A0[15]*B0[15] |
| Row1 | A1[0]*B1[0] | A1[1]*B1[1] | A1[2]*B1[2] | . . . A1[15]*B1[15] |
| Row2 | A2[0]*B2[0] | A2[1]*B2[1] | A2[2]*B2[2] | . . . A2[15]*B2[15] |
| . . . | . . . | . . . | . . . | . . . . . . |
| Row15 | A15[0]*B15[0] | A15[1]*B15[1] | A15[2]*B15[2] | . . . A15[15]*B15[15] | independently receive and operate on operands from the one or more memories. In some embodiments, read logic circuits (e.g., read logic circuit 411) read and assign operands to each PE based on the operation type being performed and the PE identifier or PE number. Accordingly, for example, the read In the above Table 1, the PEs in each row get a different operand A—row0 gets A0, row1 gets A1, and so on. Similarly, the PEs in each column get a different operand B—col0 gets B0, col1 gets B1, and so on. Further, each PE in each row, gets a unique channel number from its two operands. Here, the 16 channels of operand A and B are assigned across the 16 columns. In the assignment shown above, the PEs may pick their own unique set of operands for Depth-wise convolution, based on their IDs, for example. However, as seen from the assignment above, the PEs in the same column know, based on their position, that they must all pick operands from the same channel. In the assignment shown above, PEs in column 0 operate on channel 0, PEs in column 1 operate on channel 1, and so on.

Figure 7A:
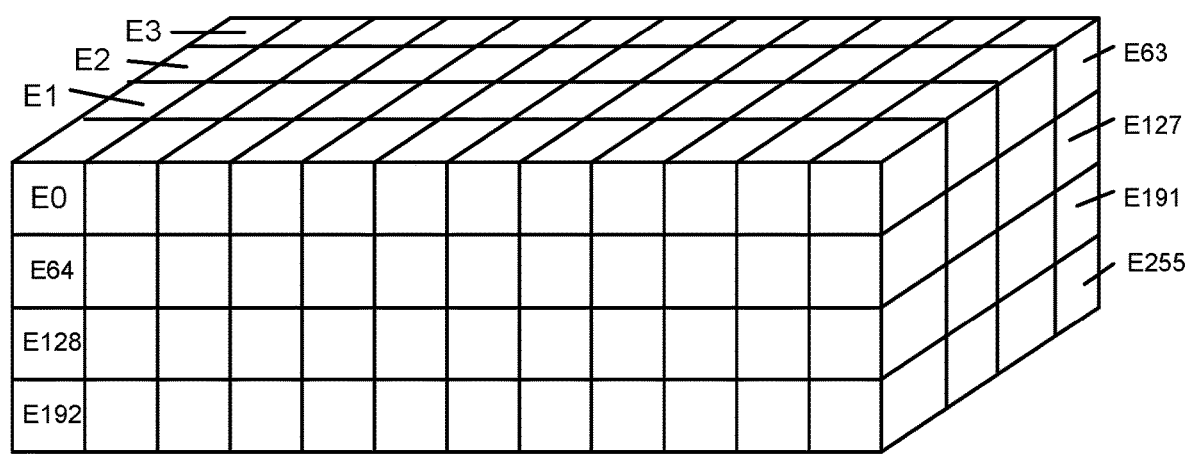
FIG. 7A illustrates an example input tensor according to an embodiment.
Figure 7B:
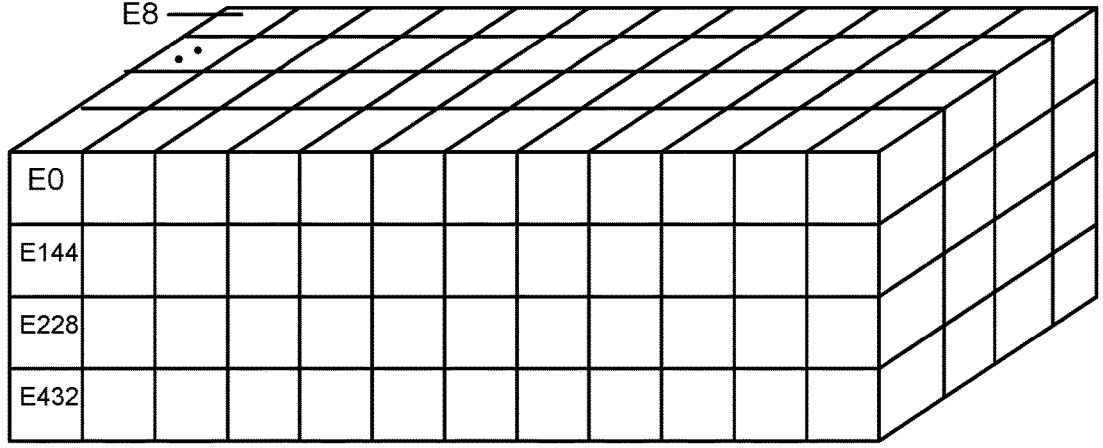
FIG. 7B illustrates an example filter according to an embodiment.
Figure 7C:
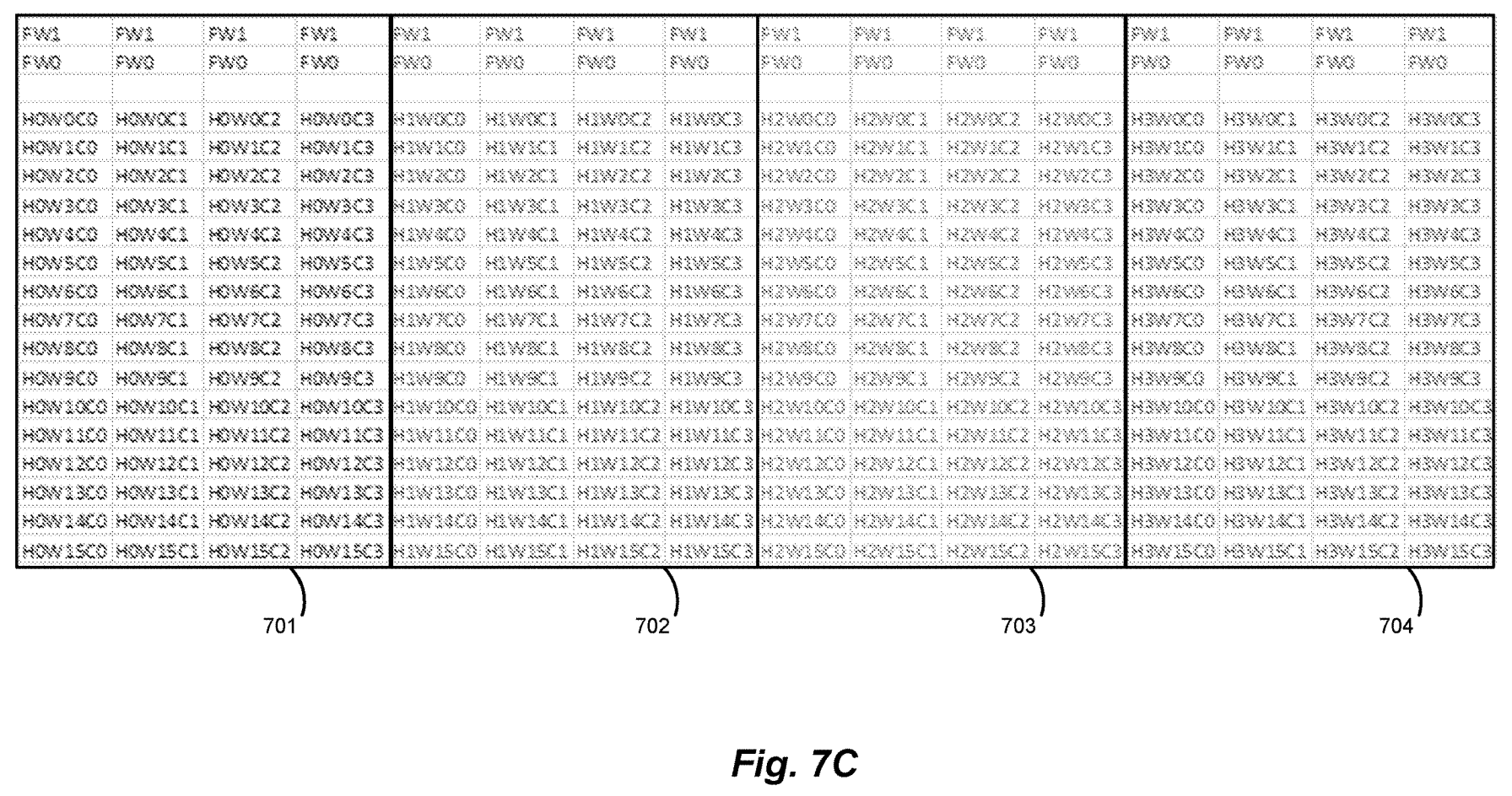

FIG. 7A illustrates an example input tensor according to an embodiment. In this example, a 3×3 filter operation is performed on an input tensor having a height=4, width=16, and channel depth=4. FIG. 7B illustrates an example filter according to an embodiment. In this example, the filter tensor corresponds to one 3×3 filter for each output pixel. The assignment of input tensor operands to filter elements is shown in FIG. 7C, which illustrates operation of the PEs for the filter operation. Advantageously, the MAC array circuit is partitioned into a plurality of groups, and all PEs in a group may receive the same filter elements and process different operands along at least one dimension. For example, as illustrated in FIG. 7C, each of the 4 rows of the input (aka activation) tensor shown in FIG. 7A, is assigned to the 4 columns of PEs in one group in the MAC array. For example, columns 0, 1, 2, and 3 of PEs receive the first row in the activation tensor, columns 4, 5, 6, and 7 of PEs receive the second row in the activation tensor, columns 8, 9, 10, and 11 of PEs receive the third row in the activation tensor, and columns 12, 13, 14, and 15 of PEs receive the fourth row in the activation tensor. The four columns of PEs in each group, while they filter, each column receives a different channel element from the activation tensor. Here, it can be seen that each group of 4 columns of PEs 701-704 share the filter elements, while every group of PEs is processing different height-elements, and while every column of PEs in a group receives different channel elements. Thus, different groups process different operands along the height dimension.

In one embodiment, the multipurpose MAC array may be configured to perform a matrix multiplication (Matmul) operation. For example, for a Matmul operation where a first matrix A is a 16×16 matrix having elements A0[15:0] . . . A15[15:0] and a second matrix B is a 16×16 matrix having elements B0[15:0] . . . B15[15:0], the assignment of matrix elements to PEs is as shown in Table 2.

TABLE 2

|  | B0[15:0] | B1[15:0] | . . . | B15[15:0] |
|---|---|---|---|---|
| A0[15:0] | PE0 | PE1 | . . . | PE15 |
| A1[15:0] | PE16 | PE17 | . . . | PE31 |
| . . . | . . . | . . . | . . . | . . . |
| A15[15:0] | PE240 | PE241 | . . . | PE255 |

In the above Table 2, PE0 is assigned the multiplication of the row A0[15:0] and column B0[15:0], PE1 is assigned the multiplication of the row A0[15:0] and column B1[15:0], and so forth for other PEs up to PE255, which is assigned the multiply-accumulation of row A15[15:0] and B15[15:0].

Further Examples

Each of the following non-limiting features in the following examples may stand on its own or may be combined in various permutations or combinations with one or more of the other features in the examples below.

In one embodiment, the present disclosure includes a multipurpose multiply-accumulator (MAC) array circuit comprising: one or more input memories for receiving operands; and a plurality of multiply-accumulator circuits each selectively coupled to the one or more input memories to receive at least a pair of operands and generate a result, wherein each of the plurality of multiply-accumulator circuits receives operands from the one or more input memories independently, wherein selection of operands from the one or more input memories is controlled based on at least an operation type, wherein different operation types configure the plurality of multiply-accumulator circuits to receive different pairs of operands from the one or more input memories to execute particular operation types.

In another embodiment, the present disclosure includes a method of performing multiple operation types in a multiply-accumulator (MAC) array circuit comprising: receiving operands in one or more input memories; controlling selection of operands from the one or more input memories based on an operation type, wherein different operation types configure the plurality of multiply-accumulator circuits to receive different pairs of operands from the one or more input memories to execute particular operation types; and selectively coupling each of a plurality of multiply-accumulator circuits to the one or more input memories to receive at least a pair of operands and generate a result, wherein each of the plurality of multiply-accumulator circuits receives operands from the one or more input memories independently.

In one embodiment, selection of operands from the one or more input memories is further controlled based on a data type.

In one embodiment, the operation type is in the set of: a three-dimensional convolution, a matrix multiplication, a depth-wise convolution, and an M×N filter operations, where M and N are integers.

In one embodiment, the one or more input memories comprise a first first-in first-out memory (FIFO) configured to receive a plurality of first operands and a second first-in first-out memory (FIFO) configured to receive a plurality of second operands, wherein the first operands and second operands are coupled to the plurality of multiply-accumulator circuits as pairs of operands.

In one embodiment, the MAC array circuit further comprises a state machine having at least one input to receive a signal indicting an operation and/or data types and a plurality of FIFO memory outputs configured to control loading of operands into the plurality of multiply-accumulator circuits based on the operation and/or data types.

In one embodiment, the MAC array circuit further comprises a plurality of read logic circuits, wherein each of the plurality of multiply-accumulator circuits has an associated read logic circuit to control loading of operands.

In one embodiment, each read logic circuit comprises a read pointer and a state machine to control reading of operands by the read pointer.

In one embodiment, the MAC array circuit further comprises a plurality of identifiers configured to specify a position of each of the plurality of multiply-accumulator circuits within the multipurpose multiply-accumulator (MAC) array circuit so that the plurality of multiply-accumulator circuits independently receive and operate on operands from the one or more memories.

In one embodiment, the read logic circuits read and assign operands to each multiply-accumulator circuit based on the operation type being performed and the identifier.

In one embodiment, the plurality of multiply-accumulator circuits receive operands from the at least one input memory without software interaction.

In one embodiment, the operation type is a three-dimensional convolution, and wherein, during execution, each multiply-accumulator circuit in each column receives a unique first operand, and wherein each multiply-accumulator circuit in each row receives a unique second operand, and wherein the plurality of multiply-accumulator circuits produce results at different times.

In one embodiment, the operation type is a depth-wise convolution, and wherein, during execution, each multiply-accumulator circuit in each row receives a different first operand and each multiply-accumulator circuit in each column a different second operand, and wherein each multiply-accumulator circuit receives a unique channel number from the first and second operands.

In one embodiment, the operation type is an M×N filter operations, where M and N are integers, and wherein the multiply-accumulator (MAC) array circuit is partitioned into a plurality of groups, and wherein different groups received the same filter elements and process different operands along at least one dimension.

In one embodiment, the operation type is a matrix multiplication, and wherein each multiply-accumulator circuit receives a different column and different row of two input vectors.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A multipurpose multiply-accumulator (MAC) array circuit comprising:

one or more input memories for receiving operands; and a plurality of multiply-accumulator circuits each selectively coupled to the one or more input memories to receive at least a pair of operands and generate a result, wherein each of the plurality of multiply-accumulator circuits receives and operates on operands from the one or more input memories independently of other multiply-accumulator circuits in the multipurpose multiply-accumulator (MAC) array circuit, each of the plurality of multiply-accumulator circuits associated with one or more identifiers configured to specify a position of a respective multiply-accumulator circuit within the multipurpose multiply-accumulator (MAC) array circuit, wherein assignment of operands from the one or more input memories to a specific multiply-accumulator circuit is controlled based on at least an operation type and a respective identifier for the specific multiply-accumulator circuit, wherein different operation types configure the plurality of multiply-accumulator circuits to receive different pairs of operands from the one or more input memories to execute particular operation types.

2. The multipurpose multiply-accumulator (MAC) array circuit of claim 1, wherein selection of operands from the one or more input memories is further controlled based on a data type.

3. The multipurpose multiply-accumulator (MAC) array circuit of claim 1, wherein the operation type is in the set of: a three-dimensional convolution, a matrix multiplication, a depth-wise convolution, and an M×N filter operations, where M and N are integers.

4. The multipurpose multiply-accumulator (MAC) array circuit of claim 1, wherein the one or more input memories comprise a first first-in first-out memory (FIFO) configured to receive a plurality of first operands and a second first-in first-out memory (FIFO) configured to receive a plurality of second operands, wherein the first operands and second operands are coupled to the plurality of multiply-accumulator circuits as pairs of operands.

5. The multipurpose multiply-accumulator (MAC) array circuit of claim 1, further comprising a state machine having at least one input to receive a signal indicating an operation and/or data types and a plurality of first-in first-out memory (FIFO) outputs configured to control loading of operands into the plurality of multiply-accumulator circuits based on the operation and/or data types.

6. The multipurpose multiply-accumulator (MAC) array circuit of claim 1, further comprising a plurality of read logic circuits, wherein each of the plurality of multiply-accumulator circuits has an associated read logic circuit to control loading of operands.

7. The multipurpose multiply-accumulator (MAC) array circuit of claim 6, wherein each read logic circuit comprises a read pointer and a state machine to control reading of operands by the read pointer.

8. The multipurpose multiply-accumulator (MAC) array circuit of claim 6, wherein the read logic circuits read and assign operands to each multiply-accumulator circuit based on the operation type being performed and the associated identifier of the one or more identifiers.

9. The multipurpose multiply-accumulator (MAC) array circuit of claim 6, wherein the plurality of multiply-accumulator circuits receive operands from the one or more input memories without software interaction.

10. The multipurpose multiply-accumulator (MAC) array circuit of claim 1, wherein the operation type is a three-dimensional convolution, and wherein, during execution, each multiply-accumulator circuit in each column receives a unique first operand, and wherein each multiply-accumulator circuit in each row receives a unique second operand, and wherein the plurality of multiply-accumulator circuits produce results at different times.

11. The multipurpose multiply-accumulator (MAC) array circuit of claim 1, wherein the operation type is a depth-wise convolution, and wherein, during execution, each multiply-accumulator circuit in each row receives a different first operand and each multiply-accumulator circuit in each column receives a different second operand, and wherein each multiply-accumulator circuit receives a unique channel number from the different first and second operands.

12. The multipurpose multiply-accumulator (MAC) array circuit of claim 1, wherein the operation type is an M×N filter operations, where M and N are integers, and wherein the multipurpose multiply-accumulator (MAC) array circuit is partitioned into a plurality of groups, and wherein different groups receive a same set of filter elements and process different operands along at least one dimension.

13. The multipurpose multiply-accumulator (MAC) array circuit of claim 1, wherein the operation type is a matrix multiplication, and wherein each multiply-accumulator circuit receives a different column and different row of two input vectors.

14. The multipurpose multiply-accumulator (MAC) array circuit of claim 1, wherein each of the plurality of multiply-accumulator circuits has dedicated wires to couple operands from the one or more input memories to the respective multiply-accumulator circuits.

15. A method of performing multiple operation types in a multiply-accumulator (MAC) array circuit comprising:

receiving operands in one or more input memories;

controlling selection of operands from the one or more input memories based on an operation type, wherein different operation types configure a plurality of multiply-accumulator circuits to receive different pairs of operands from the one or more input memories to execute particular operation types; and selectively coupling each of the plurality of multiply-accumulator circuits to the one or more input memories to receive at least a pair of operands and generate a result, wherein each of the plurality of multiply-accumulator circuits receives operands from the one or more input memories independently.

16. The method of claim 15, wherein selection of operands from the one or more input memories is further controlled based on a data type.

17. The method of claim 15, wherein the operation type is in the set of: a three-dimensional convolution, a matrix multiplication, a depth-wise convolution, and an M×N filter operations, where M and N are integers.

18. The method of claim 15, wherein the one or more input memories comprise a first first-in first-out memory (FIFO) configured to receive a plurality of first operands and a second first-in first-out memory (FIFO) configured to receive a plurality of second operands, wherein the first operands and the second operands are coupled to the plurality of multiply-accumulator circuits as pairs of operands.

19. The method of claim 15, wherein the multiply-accumulator (MAC) array circuit comprises a state machine having at least one input to receive a signal indicating an operation and/or data type and a plurality of first-in first-out memory(FIFO) outputs configured to control loading of operands into the plurality of multiply-accumulator circuits based on the operation and/or data types.

20. The method of claim 15, wherein the multiply-accumulator (MAC) array circuit comprises a plurality of read logic circuits, wherein each of the plurality of multiply-accumulator circuits has an associated read logic circuit to control loading of operands.

* * * * *